W. E. BEECK.
SCRIBER ATTACHMENT.
APPLICATION FILED MAR. 16, 1917.
1,262,434.
Patented Apr. 9, 1918.
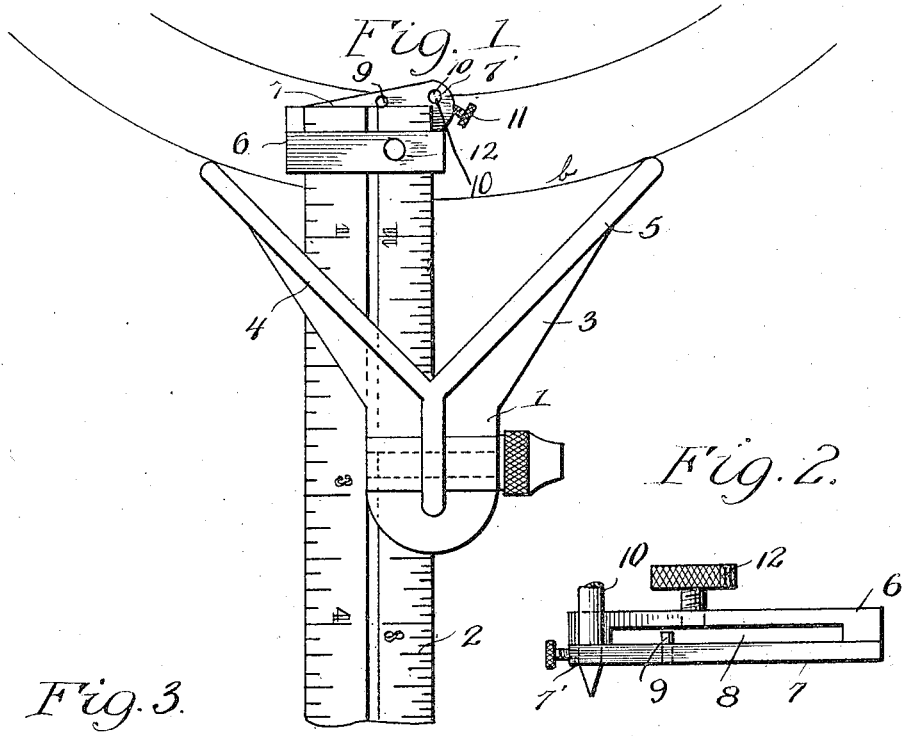
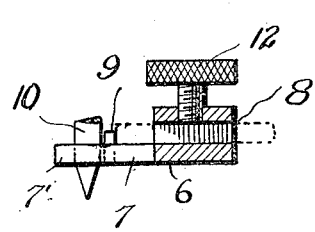
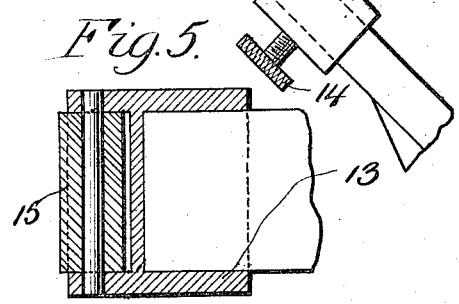
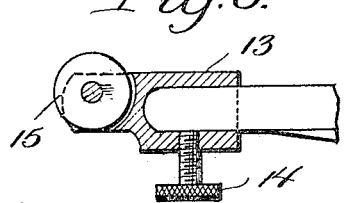
WITNESSES
Thos. B. Roscow
Wm P. Smith
INVENTOR
W. E. Beeck.
BY Victor J. Evans
ATTORNEY

UNITED STATES PATENT OFFICE.

WILLIAM E. BEECK, OF WILKINSBURG, PENNSYLVANIA.

SCRIBER ATTACHMENT.

1,262,434.  Specification of Letters Patent.  Patented Apr. 9, 1918.

Application filed March 16, 1917. Serial No. 155,347.

*To all whom it may concern:*

Be it known that I, WILLIAM E. BEECK, a subject of the Emperor of Germany, residing at Wilkinsburg, in the county of Allegheny and State of Pennsylvania, have invented new and useful Improvements in Scriber Attachments, of which the following is a specification.

This invention relates to a scriber attachment for measuring devices and has for its primary object to provide a scriber that may be readily attached to a well known form of measuring instrument now on the market.

An object of the invention is to so construct the scriber that the scribing element thereof may be so disposed with relation to certain elements of the measuring instrument that a circular line may be scribed concentrically of a circular surface.

Besides the above my invention is distinguished in the use of rollers in combination with a scriber whereby friction may be reduced.

With these and other objects in view the invention will be better understood from the following detail description taken in connection with the accompanying drawing wherein:—

Figure 1 is a top plan view of a measuring instrument showing my scriber attached thereto.

Fig. 2 is an end elevation of the scriber.

Fig. 3 is a sectional view of the scriber.

Figs. 4, 5 and 6 are detail views of an anti-friction device that may be used with my invention.

Again referring to the drawing the numeral 1 designates a well known form of measuring instrument comprising a ruler 2, upon which is adjustably mounted a V-shaped arm 3, the limbs 4 and 5 of which being so disposed as to readily coöperate with my scriber for scribing a curved line.

My improved form of scriber consists of a bracket 6 having a sleeve part 8 to receive an end portion of the rule 2, said bracket having an extension 7 on its lower edge which is provided with a lateral extension 7' on one end. The movement of the bracket upon the ruler in one direction is limited by a pin 9 secured to the extension and arranged in the path of movement of the ruler. The lateral extension 7' has slidably mounted therein a scribing pin 10 held in any adjusted position in line with one edge of the ruler 2 by a thumb screw 11. Threaded in the bracket is a second thumb screw 12 binding against the ruler for limiting the movement of the bracket on the ruler in a direction away from the pin *a*.

By referring to Fig. 1, it will be seen that by constructing and associating the scriber with the ruler as shown the same may coöperate with the ends of the limbs 4 and 5, for scribing a circular line concentrically of the circular surface *b*, and by adjusting the arm upon the ruler the distance between the scribed circular line and circular surface may be changed.

If found advantageous in practice the limbs 4 and 5 may have secured thereto anti-friction devices such as illustrated in Figs. 4, 5 and 6 which may consist of a sleeve 13 clamped to the arm by the thumb screw 14 and supporting for rotation rollers 15.

From the foregoing description taken in connection with the accompanying drawing it should be apparent that I provide a very simple device that may be readily attached to a measuring instrument for converting the same into a scriber gage for scribing curved lines.

Having described my invention what I claim is:—

In combination with a measuring instrument comprising a ruler and a V-shaped arm slidably mounted on the ruler, a scriber comprising a bracket having a sleeve part to receive the end of the ruler, an extension formed on the bottom of the bracket and extending beyond the sleeve part, a pin on said extension acting as a stop to position the ruler, a lateral extension on one end of said extension and a scriber pin carried by said lateral extension and located on a line with one edge of the ruler and adjacent the corner thereof when said ruler is positioned by the pin.

In testimony whereof I affix my signature.

WILLIAM E. BEECK.

Copies of this patent may be obtained for five cents each, by addressing the "Commissioner of Patents, Washington, D. C."